Feb. 16, 1932.  J. RANTZ  1,844,976
INSTANT NOTE FINDER
Original Filed May 25, 1929  2 Sheets-Sheet 1

Inventor
Jock Rantz
By Clarence A. O'Brien
Attorney

Feb. 16, 1932.  J. RANTZ  1,844,976
INSTANT NOTE FINDER
Original Filed May 25, 1929  2 Sheets-Sheet 2
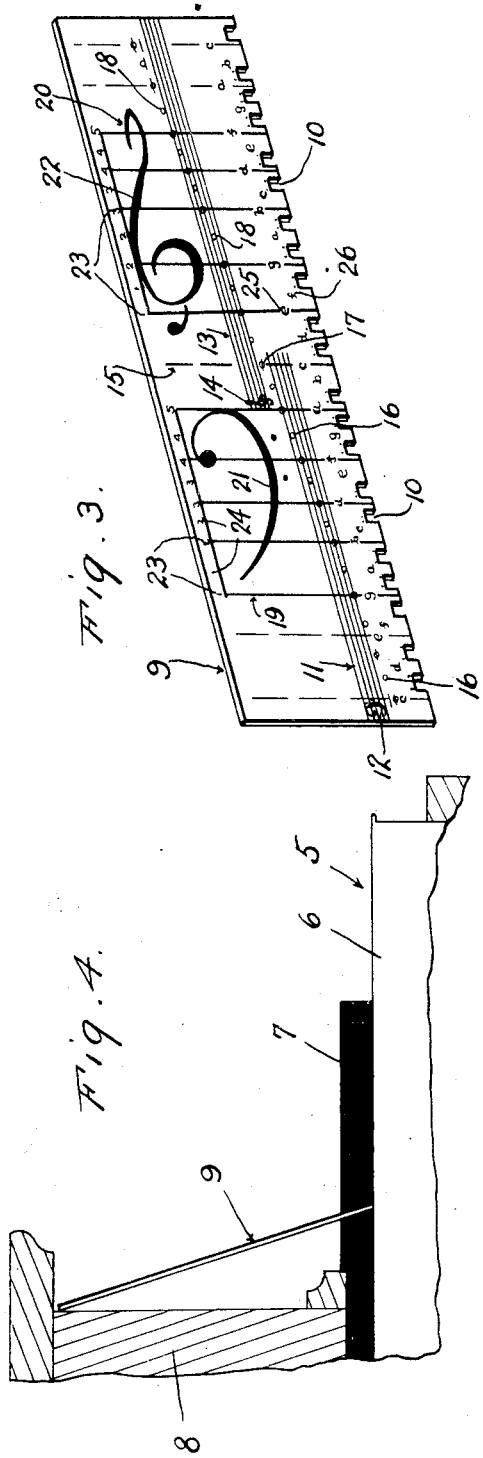
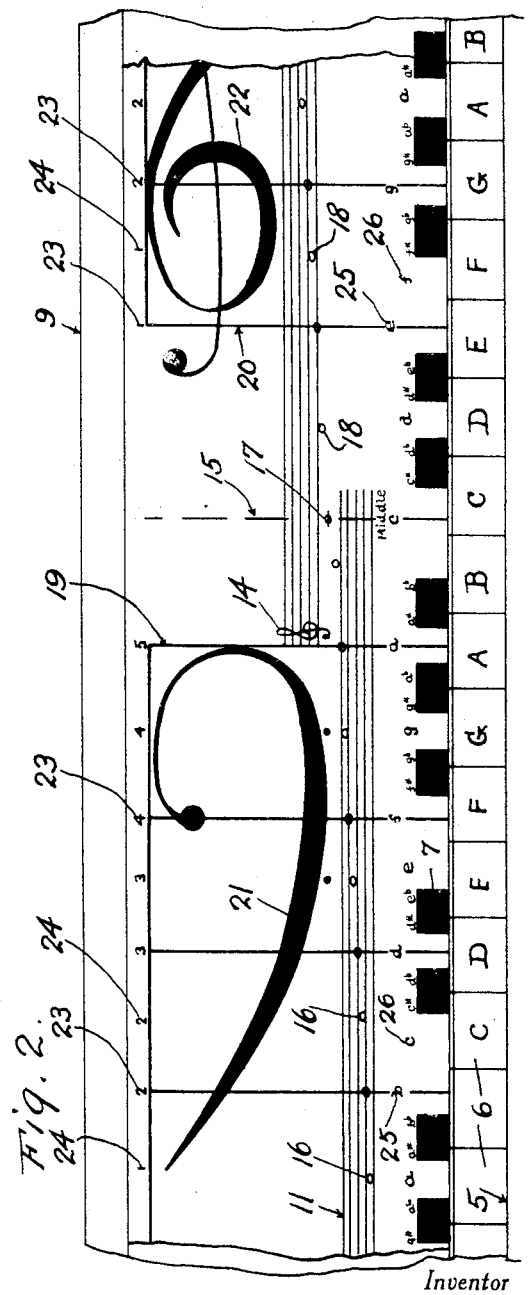
Inventor
Jock Rantz
By Clarence A. O'Brien
Attorney Patented Feb. 16, 1932

1,844,976

UNITED STATES PATENT OFFICE

JOCK RANTZ, OF SAN FRANCISCO, CALIFORNIA

INSTANT NOTE FINDER

Application filed May 25, 1929, Serial No. 365,877. Renewed September 12, 1931.

This invention relates to an improved music chart of the variety used for educational purposes in teaching students music, the same being especially designed to permit unconfused location of the keys on the keyboard and being such in arrangement as to facilitate correlation between written notes and the piano keyboard, thereby permitting the device to be accurately and briefly hereinafter referred to as an instant note finder.

Briefly stated, my inventive conception calls for the utilization of an elongated body of cardboard or other appropriate material which is adapted to rest removably on the keyboard in front of the panel, the same having notches in its lower ends to fit over the black keys for proper maintenance, whereby to permit the device to be conveniently and expeditiously placed in corerct position to provide for the simplified method of teaching with, or without a teacher, the relationship of musical notations to the piano keyboard.

Otherwise stated, the invention has reference to an article of the aforesaid construction whose working face is printed to provide tabular data or indicia systematically arranged to permit rapid correlation of musical notations with the complemental keys on the keyboard.

The device is characterized by previously unequaled arrangement of characters which are distinctly depicted to accomplish the following correlations:

First, the position of the keys; secondly, the sound of the key; third, the name of the key; fourth, the name of the line or space corresponding to the key; fifth, the name and position of the note representing the key, and sixth, the numerical order of the line and spaces of complemental staves.

Other features and advantages of this novel accessory will become more readily apparent from the following description and drawings.

In the drawings:

Figure 2 is a fragmentary view also showing the keyboard and chart and a portion of the body of the piano with the chart in actual operative position.

Figure 3 is a perspective view of the chart per se.

Figure 4 is an end view showing the angular relationship of the chart to the panel and keyboard.

Figure 1:
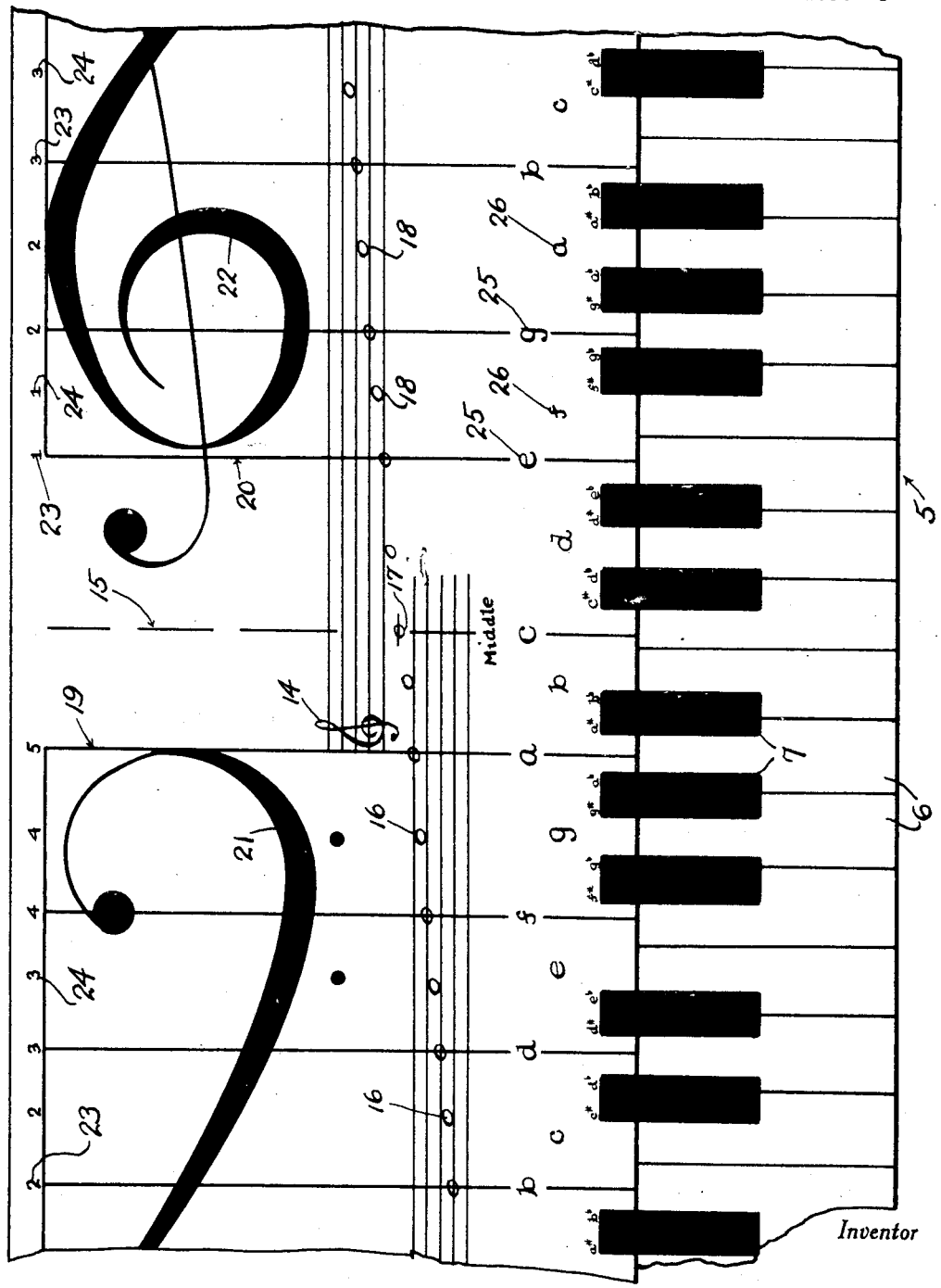
Figure 1 is a fragmentary diagrammatic view showing a portion of a conventional piano key board with the chart occupying a horizontal plane (not the position for actual use) to disclose in an exaggerated manner the cooperation of the chart with the keyboard.

In carrying the invention into effect I have utilized a novel, and possible unique, arrangement of printed matter, which at a glance, reveals all the information requisite to a full understanding of the facts of musical notation, the relative positions of the bass and treble clefs, and their continuation one into the other; the names of the lines and spaces, such names being so alined as to distinguish the lines from the spaces; and the numerical order of the lines and spaces; and by a double representation of the staves all this information is directly correlated to the piano keyboard in a hitherto unutilized manner.

Referring first to Figure 4 it will be seen that the reference character 5 designates generally an ordinary piano keyboard. This includes, as is customary, the white keys 6 and the black keys 7. The numeral 8 designates the usual front panel and 9 designates as a unit, the improved chart. This chart is essentially in the form of an elongated or rectangular body of the type seen in Figure 3. It may be of any suitable material. I have found it expedient to use heavy cardboard for the purpose. In order to hold the device in proper position I provide a multiplicity of keeper notches 10 in the lower edge and these are adapted to be placed in a proper position over the black keys so that the device assumes the inclined position with respect to the keyboard represented in Figure 4. This device is adapted to set directly upon the middle four octaves of the piano so as to take in a range of keys extending from C below the bass clef to C above the treble clef. Occupying the left hand half (see Figure 3) is a primary bass clef staff 11. This occupies a horizontal position as is usual and is of conventional five-line construction. At one end of the customary bass clef signature 12 and at the right hand end and on a plane higher than the staff 11 is a primary treble staff 13 having the customary treble clef signature 14. The terminal end of the staff 11 underlies the introductory end of the staff 13 whereby middle C provides a common indicating note for both staves 11 and 13. Here is a division line 15 which may be conveniently distinguished as an index. The reference characters 16 designate the properly placed notes of the bass staff 11 ranging from C below the bass clef to middle C. Middle C is distinguished in note form by the reference character 17, and is in alinement with and intersected by the index line 15. The reference characters 18 designate the remaining notes of the treble clef staff 13 ranging from middle C to C above the staff.

Closely associated with these primary staffs 11 and 13 are secondary fictitious staffs 19 and 20 respectively. These staffs 19 and 20 are of accentuated form, being printed in heavy black and made up of five lines and four spaces each with the lines disposed at right angles to the lines of the complemental staffs 11 and 13 in the manner shown. They are obviously arranged on opposite sides of the index line 15 and cooperate with the respective bass and treble staffs. In fact it has been found expedient and helpful to provide the staff 19 with an enlarged bass clef signature 21 and the staff 20 with the correspondingly enlarged treble clef signature 22.

The ordinals 23 denote numerals which cooperate with the respective lines of these secondary staffs 19 and 20, the numeral 1 cooperates with the first line of the complemental primary staff, and the numeral 2 with the second line of said staff and so on. The reference character 24 designates numerals arranged in proper numerical progression to represent the first, second and third and fourth spaces of these staffs 19 and 20, respectively. It follows then that the first line (designated by the numeral 1) of the staff 20 cooperates with the corresponding first line of the staff 13 and intersects the character which is utilized to denote the note e. The second line cooperates with and indicates e, the third line b, and so on. This is also true of the spaces. Since the first space of the staff 20 cooperates with the corresponding space of the staff 13 representing f which is found in the first space on the staff 13.

Supplementing the cooperation of these numerals, and the cooperating staffs as well as the musical notation on the primary staffs, are auxiliary letters which immediately give the name of the respective notes and the keys which the notes designate. An example of the treble clef will suffice. For instance the reference character 25 designates e which is found on the first line of the supplemental treble staff 20. This first line as before indicated intersects the note e on the staff 13. The reference character 26 designates f for the first space of the staff. This is found in the first space of the staff 20, and its corresponding notes is found printed in the first space of the complemental staff 13. This idea is carried through both bass and treble staves.

With the device in proper position on the piano keyboard as shown both in Figures 1 and 2 it is an easy matter for the user to locate middle C, and to ascertain that all characters on the left of the index line 15 designate keys and notes representative of the bass clef, while all those on the right of this index line 15 represent notes, letters, and keys of the treble clef. This distinction between the two clefs is made more apparent by the presence of the accentuated vertically disposed supplemental or secondary staves 19 and 20, cooperating with their complemental horizontal staves 11 and 13, for at a glance the enlarged signatures will show which portion of the keyboards is the bass and which portion is the treble.

This accessory is intended to be owned by the beginner, who without the aid of a teacher may utilize it in a dependable manner to rapidly calculate and correctly learn all that he needs to know about the relationship of musical notations to the arrangement of keys on the piano keyboard. The presence on the chart of the numerical figures shows the numerical order of the keys. The presence of the primary and secondary staves with the note representation and the designating letters gives the names of the keys and the position to the keys with respect to the notes on the primary staves. The presence of the accentuate vertically disposed staves 19 and 20 facilitates rapid assimilation and readily distinguishes the bass from the treble.

It is believed that by considering the description in conjunction with the drawings, the reader will be able to obtain a clear understanding of the features depicted on the chart and their relationship to the keys on the piano keyboard. Thus it will be seen that the device functions as an instant note finder and educational chart. It is thought however, that a more detailed description is unnecessary.

Having thus described the invention, what I claim as new and desire to secure by Letters Patent is:—

1. As a new product of manufacture, an instant note finding chart of the class described comprising a body provided with a primary bass clef staff provided with progressive musical notation, said staff beginning at one end with the body, occupying a horizontal plane and terminating adjacent the center of the body, a second primary treble staff at the opposite end portion of the body having its inner ends overlying the terminal ends of said bass staff and provided with progressive musical notations and a treble clef signature, an index line intersecting the overlapping portions of said staves and intended to represent middle C, there being a single note character common to both of said staves, and a single letter character common to both of said staves.

2. As a new product of manufacture, an instant note finding chart of the class described comprising a body provided with a primary bass clef staff provided with progressive musical notation, said staff beginning at one end with the body, occupying a horizontal plane and terminating adjacent the center of the body, a second primary treble staff at the opposite end portion of the body having its inner ends overlying the terminal ends of said bass staff and provided with progressive musical notations and a treble clef signature, an index line intersecting the overlapping portions of said staves and intended to represent middle C, there being a single note character common to both of said staves. a single letter character common to both of said staves, and a pair of secondary staves arranged vertically on said body and on opposite sides of said index line provided with accentuated clef signatures for the respective bass treble staves and further provided with numerical and letter indicia cooperable with corresponding notes on said first named staves.

In testimony whereof I affix my signature.

JOCK RANTZ.